United States Patent
Gauthier et al.

(10) Patent No.: US 8,027,517 B2
(45) Date of Patent: Sep. 27, 2011

(54) METHOD FOR STRATIGRAPHIC INTERPRETATION OF SEISMIC IMAGES

(75) Inventors: Jérôme Gauthier, Bois Guillaume (FR); Marie-Christine Cacas, Rueil-Malmaison (FR); Laurent Duval, Nanterre (FR)

(73) Assignee: Institut Francais du Petrole, Cedex (FR)

( * ) Notice: Subject to any disclaimer, the term of this patent is extended or adjusted under 35 U.S.C. 154(b) by 952 days.

(21) Appl. No.: 11/945,701

(22) Filed: Nov. 27, 2007

(65) Prior Publication Data

US 2008/0212841 A1 Sep. 4, 2008

(30) Foreign Application Priority Data

Nov. 27, 2006 (FR) ...................................... 06 10493

(51) Int. Cl.
*G06K 9/00* (2006.01)
(52) U.S. Cl. ...................................................... 382/109
(58) Field of Classification Search .................. 382/109; 181/108, 122; 367/14, 73; 73/1.85, 170.32; 706/929; 250/253, 265
See application file for complete search history.

(56) References Cited

U.S. PATENT DOCUMENTS

| | | | | |
|---|---|---|---|---|
| 5,148,494 A * | 9/1992 | Keskes | ........................... | 382/109 |
| 5,940,778 A * | 8/1999 | Marfurt et al. | ................... | 702/16 |
| 6,691,075 B1 * | 2/2004 | Winbow et al. | .................... | 703/2 |
| 2001/0036294 A1 | 11/2001 | Keskes et al. | | |
| 2006/0056272 A1 * | 3/2006 | Hill | ................................. | 367/73 |
| 2006/0247858 A1 | 11/2006 | Cacas | | |

FOREIGN PATENT DOCUMENTS

| EP | 1 717 604 A1 | 11/2006 |
|---|---|---|
| GB | 2 375 448 A | 11/2002 |

OTHER PUBLICATIONS

Dengliang Gao: "Volume Texture Extraction for 3D Seismic Visualization and Interpretation", Geophysics Soc. Exploration Geophysicists USA, vol. 68, No. 4, Jul. 2003, pp. 1294-1302, XP 002457444, ISSN: 0016-8033.

Satinder Chopra et al: "Seismic Attributes—A Promising Aid for Geologic Prediction", CSEG Recorder, 2006, pp. 110-121, XP002457445.

* cited by examiner

*Primary Examiner* — Jason M Repko
*Assistant Examiner* — Shervin Nakhjavan
(74) *Attorney, Agent, or Firm* — Antonelli, Terry, Stout & Kraus, LLP.

(57) ABSTRACT

A method for stratigraphic interpretation of a seismic image for determining a sedimentary history of an underground zone having application to petroleum exploration. The seismic reflectors of the image are digitized by means of an applied shape recognition technique. At least one attribute characteristic of the structure of the image in the vicinity of each reflector is calculated for a set of reflectors by means of an image analysis technique. This analysis is based on at least one analysis window whose shape is controlled by the associated reflector. Pertinent reflectors, in the sense of the stratigraphic interpretation, are selected from among this set of reflectors on the basis of this attribute. Finally, the sedimentary history of the underground zone is reconstructed from a stratigraphic interpretation of the reflectors thus selected.

34 Claims, 5 Drawing Sheets

METHOD FOR STRATIGRAPHIC INTERPRETATION OF SEISMIC IMAGES

BACKGROUND OF THE INVENTION

1. Field of the Invention

The present invention relates to the sphere of stratigraphic interpretation of seismic data. More particularly, the invention relates to processes for automatic detection of seismic reflectors showing pertinent characteristics for seismic stratigraphy interpretation, such as sedimentary layer convergence characteristics.

2. Description of the Prior Art

Seismic imagery is a method of observing the architecture of the subsoil, notably used in the fields of petroleum exploration and characterization of underground natural hydrocarbon reservoirs. This technique is based on the emission of acoustic signals in the subsoil and recording of the propagated signals and reflected on particular acoustic reflectors. These signals are processed so as to form a two or three dimensional seismic image. This seismic image is a series of vertical records referred to as "seismic traces". These seismic traces represent the amplitude of the signal received as a function of time. The recorded signals generally correlate from one trace to the next, which is translated, in a seismic image, into sub-horizontal lines, more or less rectilinear, thick and continuous, referred to as lineations or reflectors. These lines represent the interfaces between sedimentary layers. A two-dimensional seismic image corresponds to a vertical section of the subsoil. An example of a two-dimensional seismic image is given by FIG. 2. The two dimensions are depth Z and a sub-horizontal geographic direction X.

From the observation of the seismic image, the seismic stratigraphy interpreter has a certain number of empirical rules for finding clues allowing reconstruction of the sedimentary history of the studied zone, and therefore to find subsoil zones likely to be oil traps. The interpreter notably uses the analysis of the "brightness" and of the length of the reflectors, of their position and their orientation in relation to neighboring reflectors (parallel reflectors can indicate a regular deposit at a great water depth and of a limited petroleum interest, fan-shaped convergent reflectors indicate a progressive tilt of the formation during deposition, having implications on the distribution of the sediments), and on the way the latter interrupt on one another. Analysis of the geometry of reflectors is for example the subject of a basic seismic stratigraphy article:

Vail. P. R., R. M. Mitchum, and S. Thompson, III, 1977, [<<] "*Seismic Stratigraphy and Global Changes of Sea Level, part 4: Seismic Stratigraphy and Global Changes of Sea Level, in Payton*", C. E. (ed.), Seismic Stratigraphy—Applications to Hydrocarbon Exploration: Amer. Assoc. of Petrol. Geologists, Memoir 26, p. 83-97.

The interpretation stage is often very delicate and it entirely depends on the interpreter's sedimentologic expertise. There are few tools allowing assistance in this task, which with a more complex seismic image often shows several hundred reflectors in 2D and several thousands in 3D.

Several projects have been undertaken in the past years, providing seismic image analysis methods for facilitating the stratigraphic interpretation procedure. The following document that summarizes these methods can be mentioned for example:

S. Copra and K. J. Marfurt, [<<] *Seismic Attribute Mapping of Structure and* Stratigraphy", Distinguished Instructor Series, no 9, EAGE, 2006.

The work of the "TriTex" project can also be mentioned: European Research Project Funded by the European Commission, Directorate-General Information Society, "Automated 3D Texture Content Management in Large-Scale Data Sets", Project No.: IST-1999-20500, Super-final report.

This work provides image analysis methods that convert an initial image into a final image. They therefore are only a preprocessing stage before interpretation. In fact, the seismic interpreter must eventually provide a "pick" of the seismic image, that is manually extract therefrom, by digitizing, objects referred to as seismic reflectors, expressed in vectorized form: a reflector is vectorized by a 2D broken line, or by a 3D discretized surface. The methods presented above provide a transformation of the initial image that facilitates picking, but they do not perform this picking.

Among the image analysis methods provided, some are particularly interesting for seismic stratigraphy because they relate to the detection of convergences in seismic images. Examples thereof are:

T. Randen et al, [<<] "*New Seismic Attributes for Automated Stratigraphic Facies Boundary Detection*"[>>], SEG-98, New Orleans, La., Expanded Abstracts, September 1998, A. Barnes, [<<] "Attributes for Automating Seismic Facies Analysis", SEG Technical Program, Expanded Abstracts—2000—pp. 553-556.

The feature these methods have in common is the preliminary determination of a "field of directional vectors" of the image to be analyzed. This is, at each pixel, in determining if the image has a texture oriented in a square neighborhood centered on the considered pixel, and in calculating the direction vector(s) thereof. The latter calculation determines a single mean local orientation (Randen, Barnes).

In Barnes' work, quantification of the reflectors convergence is obtained by calculating the divergence of the field of directional vectors. In Randen's work, the directional field is subjected to a search for flowlines whose density expresses the divergence or the convergence of the reflectors.

These methods work with mean values calculated in sliding neighborhoods of fixed and predetermined shape and size, which is not perfectly suited for seismic image interpretation. In fact, seismic images have the following particular feature: some reflectors, rectilinear or not, divide the image into two domains characterized by very different image textures wherein the dominant orientations on either side of the reflector are different. This is due to the fact that seismic reflectors correspond to sedimentary interfaces representing sudden historical changes in the sedimentologic conditions. For example, a reflector indicates the transition between a sandy environment of eolian dunes and a more clayey marine environment, possibly separated in the course of time by an erosion phase.

The aforementioned methods do not allow separation of the analysis performed in a neighborhood placed according to the position of a reflector (completely above or completely below a reflector for example), because they do not involve the notion of "reflector". They provide information that "averages" the data obtained from a neighborhood that includes different environments and that cannot be characterized by the same parameters.

The invention is a method for stratigraphic interpretation of seismic data allowing characterization of the data by parameters specific to each seismic reflector present in the seismic data. The invention notably allows automatic separate reflectors so as to extract pertinent characteristics for stratigraphic interpretation, in order to detect very precisely particular sedimentary layer layouts, such as onlap or toplap type configurations (convergence of sedimentary layers linked with the sedimentary deposit type).

SUMMARY OF THE INVENTION

The invention relates to a method for stratigraphic interpretation of seismic data for determining a sedimentary history of an underground zone, wherein the data are obtained from measurements in the zone and form a multidimensional image made up of pixels and comprising seismic reflectors. The method comprises the following stages:

digitizing the seismic reflectors by means of a shape recognition technique applied to the image, calculating, for at least one reflector R, at least one attribute characteristic of a structure of the image in the vicinity of the reflector, by means of an image analysis technique applied to at least one analysis window (FA) whose shape depends on said reflector R;

selecting at least one pertinent reflector for stratigraphic interpretation on a basis of the attribute; and reconstructing the sedimentary history of the underground zone from a stratigraphic interpretation of the selected reflectors.

According to the invention, the shape recognition technique can comprise the following stages:

applying a reflector vectorization method wherein the image is analyzed by means of a sliding window (FG) successively centered on each pixel of the image, if the pixel placed at the center of the analysis window takes a highest or lowest value of the analysis window, the latter takes a value x, otherwise it takes a value that is different from x;

digitizing the reflectors by seeking contiguous pixels of equal value and by carrying out a connectivity search;

carrying out a reflector preselection to keep only reflectors meeting predetermined stratigraphic criteria. Preselection can for example be performed by keeping only the reflectors having a given minimum length.

It can be advantageous to add a directional filtering stage.

According to the invention, in order to conform to a shape of the reflector, the analysis window can comprise N columns of fixed height ($M_1$ pixels), the columns being centered, regarding heightened[,] on the at least one reflector R. This analysis window can be translated vertically in relation to the reflector according to one of the following extreme configurations: totally below the reflector or totally above the reflector.

An analysis window can be defined for each pixel of the at least one reflector R located at a distance of at least N/2 pixels from the ends of the at least one reflector R.

According to the invention, an analysis window can be transformed by deformation of the window by vertical sliding of the columns thereof, so as to obtain a window of rectangular shape.

The method according to the invention comprises an attribute calculation. This calculation can comprise the following stages:

calculating at least one pixel attribute for each analysis window;

sorting the pixels of all the reflectors so as to keep only those whose pixel attributes meeting criteria selected by the interpreter;

redefining the reflectors on a basis of contiguous pixels selected in the previous stage;

calculating attributes characterizing a reflector from the pixel attributes calculated for each selected pixel; and sorting the reflectors so as to keep only those reflectors having attributes meeting certain criteria selected by the interpreter. A criterion can define an allowable range for each pixel attribute. A criterion can be belonging to attribute classes defined by means of statistical classification algorithms or neural networks.

Finally, according to the invention, the pixel attributes calculated for each window are selected from among at least one of the following attributes:

a mean grey level of the analysis window;

a standard deviation of the grey levels of the analysis window;

a texture attribute of the analysis window;

the dominant direction within the analysis window; and an apparent disorder within the analysis window.

The dominant orientation within the analysis window can be determined by carrying out the following stages:

constructing a first image F by performing, for any analysis window an oversampled complex frequency transformation;

constructing a second image |F|, by calculating the module of the first image F; and seeking maxima within the second image, so as to determine two symmetrical peaks in relation to the center of second image |F| to define a direction, whose orthogonal direction corresponds to a dominant direction.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION

The method according to the invention allows performing a stratigraphic interpretation of seismic data, that is to reconstruct the sedimentary history of an underground zone from seismic data in the form of 2D or 3D images.

A seismic image is a set of pixels whose color depends on a value of the seismic data (seismic amplitude, impedance, . . . ) at the pixel to which a precise geographical location in the subsoil corresponds. These images comprise sub-horizontal lines, more or less rectilinear, thick and continuous, referred to as seismic reflectors.

The method allows characterization of the seismic data by parameters specific to each one of these seismic reflectors. The invention notably allows automatic separation of reflectors so as to extract pertinent characteristics for the stratigraphic interpretation. A characteristic is pertinent in the sense of seismic stratigraphy when it allows assessment of the sedimentary depositional conditions of an underground zone.

Particular Embodiment of the Invention

Figure 2:
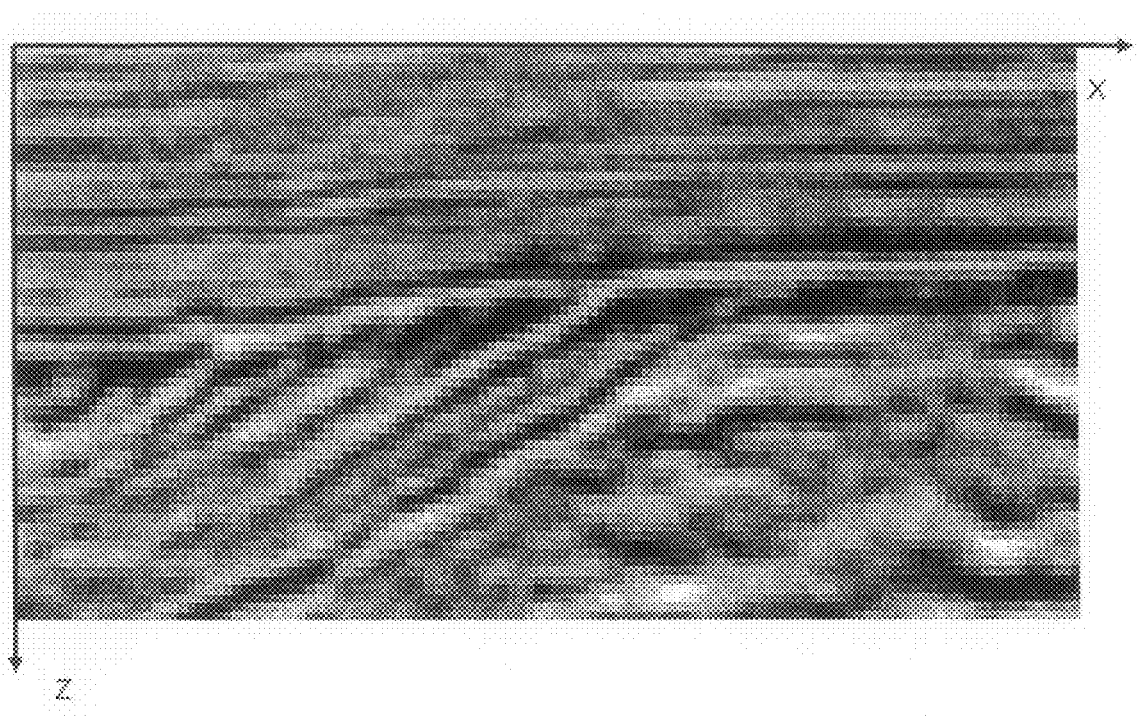
FIG. 2 shows an example of seismic data which was utilized.

According to a first embodiment, the invention is applied to two-dimensional seismic data as shown in FIG. 2. The two dimensions are depth Z and a sub-horizontal geographical direction X. Extension to data cubes (3D) is explained later. The method comprises a processing sequence that can be divided into three stages:

A. Digitizing the reflectors of the image: automatic picking stage;

B. Performing attribute calculations by means of suitable windows: image analysis applied to analysis windows whose shape is controlled by the automatically digitized reflectors; and C. Interpretation stage: sorting of the reflectors on the basis of various geometric characteristics such as, for example, the convergence measurements calculated in the previous stage, so as to keep only those pertinent in the sense of stratigraphic interpretation.

Figure 1:
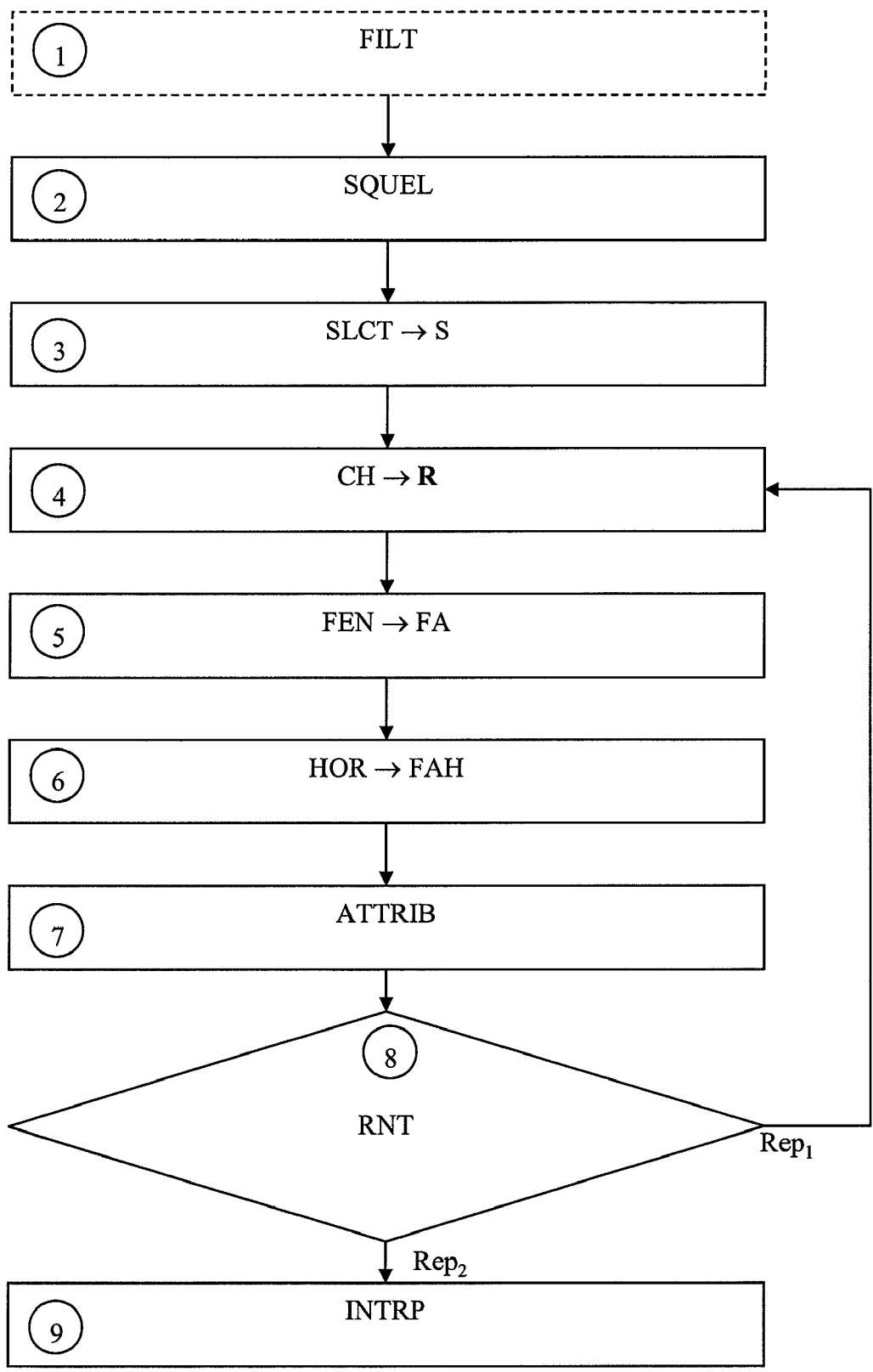
FIG. 1 shows the flowchart illustrating the method of the invention.

The succession of these stages is described in detail hereafter with reference to FIG. 1, which illustrates the sequence of the stages of the method.

A) Digitizing the Reflectors of the Image: Automatic Image Picking

Directional Filtering (Stage 1)-FILT

A directional filtering is applied to the seismic data so as to remove part of the noise from the image observed, in particular directional noise that can disturb the results of the next stages. The aim is thus to improve the apparent continuity of the reflectors. This stage is optional, but it allows improvement of the quality of the final result. Many filtering techniques can be considered for this operation. A particularly advantageous example for the procedure according to the invention is described in detail in the following articles:

J. Gauthier, L. Duval and J.-C. Pesquet, "*A Non Separable 2D Complex Modulated Lapped Transform and Its Application to Seismic Data Filtering*" in *Proceedings of European Signal Processing Conference*, September 2005, and J. Gauthier, L. Duval and J.-C. Pesquet, "*Low Redundancy Oversampled Lapped Transform and Application to 3D Seismic Data Filtering*" in *Proceedings of International Conference on Acoustic Speech and Signal Processing*, May 2006.

This method is divided into the following three parts:

transforming the original image (datum on which the method according to the invention is applied) by means of a complex lapped transform. The principle of lapped transforms is to extract original data from non disjoint blocks, and on each block to apply a window, then a redundant complex frequency type transform. It thus is a local transformation;

processing each transformed block by seeking the dominant direction (pair of dominant peaks) and by removing all the coefficients that do not correspond to directions close to the dominant one. Finally, carrying out thresholding of the remaining coefficients so as to keep only the most significant ones;

carrying out the inverse transformation that meets the theoretical conditions, referred to as "perfect reconstruction".

This stage can be carried out on a 3D basis while following the same principles as above. It is also presented in detail in the aforementioned articles.

Seeking and Vectorizing the Reflectors (Stage 2)-SQUEL

A reflector vectorization method is for example described in EP Patent Application 1,717,604. Another particularly well-suited method for implementing the procedure according to the invention is explained hereafter.

Figure 3A:
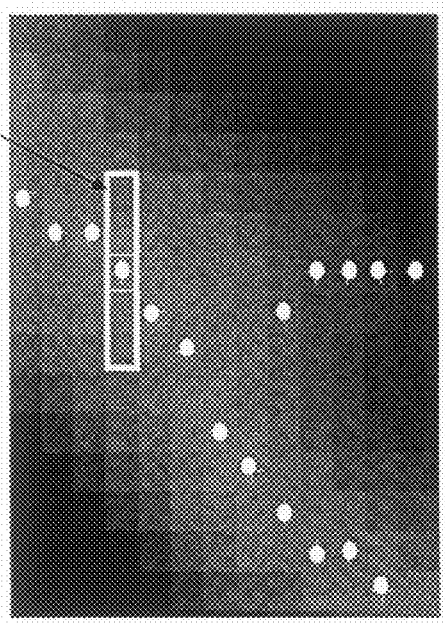
FIGS. 3A to 3D diagrammatically show processing stages.

The 2D or 3D seismic image is analyzed by means of a sliding window (FG) in form of a column of N pixels (of size N=5 for example). This vertical window is successively centered on each pixel of the image. If the pixel analyzed, that is the pixel located at the center of the analysis window, takes the highest value of the analysis window, the latter takes the value 1. Otherwise, it takes the value 0. In the image obtained, the pixels of value 1 are organized in lines (2D) or in surfaces (3D) with no bifurcations and forming a skeletization of the reflectors of the seismic image. In FIG. 3A, the pixels of value 1 are represented by a white circle according to this technique. The same technique can be applied by keeping only the pixels having the lowest value of the analysis window.

Figure 3B:
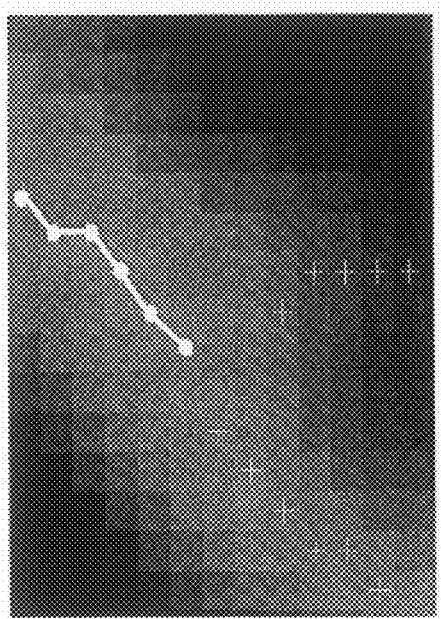
Figure 4:
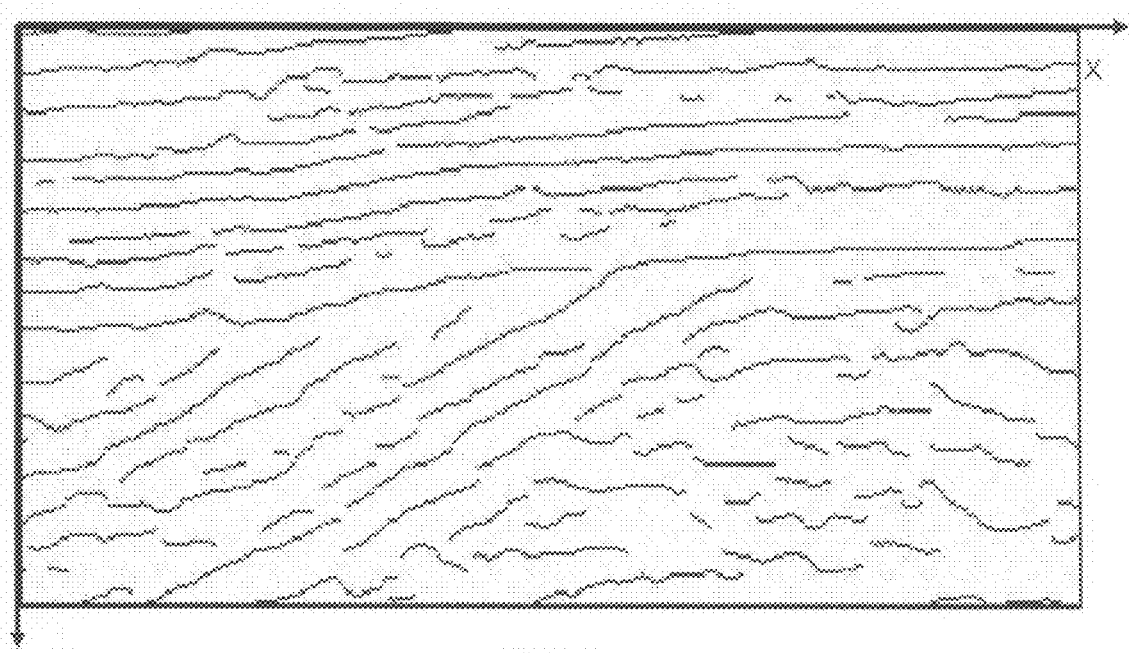
FIG. 4 shows a skeletization result.

The reflectors are then set up by seeking the successions of contiguous pixels, that is in contact by a side, a corner or an edge (3D). This thus amounts to extracting lines having a thickness of 1 pixel and forming the frame of the reflectors (FIG. 3B). By their construction, the lines (surfaces in the 3D case) thus extracted have a distinctive feature: they are not secant. A result of this stage is illustrated in FIG. 4.

Finally, the reflectors thus extracted (digitized) are indexed by carrying out a 2D 8-connectivity (3D 26-connectivity), that is at each pixel of an object one tries to find out if, among the 8 (or 26 in 3D) neighboring pixels, there is one that is not zero, and if it is the case these neighboring pixels are said to belong to the same object (referred to as reflector).

Reflectors Preselection (Stage 3)-SLCT

The last stage of the image automatic picking procedure is a stage of preselection among the reflectors digitized and indexed in stage 2, so as to keep only the reflectors having a significant length. If the length of the analysis windows (defined in stage 5) is N, only the reflectors whose length is strictly greater than N are kept. These reflectors of significant length thus make up a set S of reflectors from which the attribute calculations are carried out. To perform this preselection, it is also possible to select any stratigraphic criterion likely to contribute towards stratigraphic interpretation other than the minimum length of the reflectors.

B) Attribute Calculations by Means of Suitable Windows: Image Analysis

The dominant directions search and attribute calculations in the neighborhood of each reflector are performed iteratively, that is the reflectors of set S are processed one by one. This procedure is described hereafter.

Initialization: Selection of a Reflector of S (Stage 4)-CH

After constructing a set S of reflectors of significant length (length greater than the length of the analysis window), the first stage selects a reflector R of set S that has not been studied yet. Then stages 5 to 8 are applied to this reflector R. Another reflector is selected and processed, and this operation is repeated until all the reflectors have been processed.

Definition of Analysis Windows in Accordance with the Reflectors (Stage 5)-FEN

This stage selects pixels according to the reflector. Analysis windows suited to the needs of the stratigraphic study are therefore defined for each pixel of the reflector.

Figure 3C:
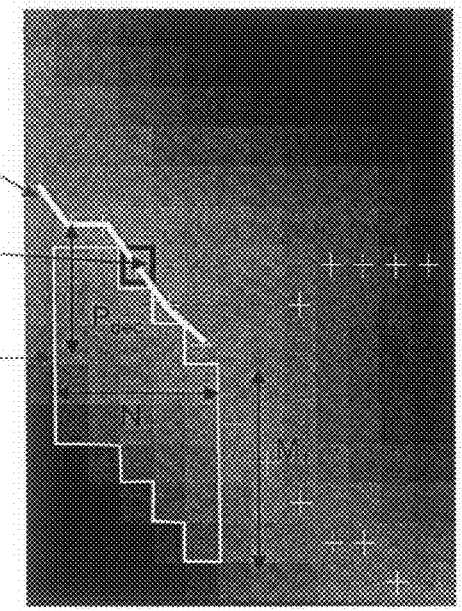

The reflector construction method guarantees that each reflector of S has at least one point in each column of the image. An image is evenly distributed pixels forming straight lines (horizontally) and columns (vertically). Analysis windows (FA) that are suited to the shape of reflector R, as illustrated by FIG. 3C, can therefore be defined. An analysis window conforms to a reflector when its shape, orientation and position are controlled by this reflector. An analysis window is therefore associated with each pixel of a reflector.

The lateral size of an analysis window is denoted by N. It depends on the temporal sampling of the seismic data. A sufficient number of reflectors is preferably involved, which leads to typical values of N of several ten (16, 32 and 64 for example).

For each pixel placed on reflector R, located at a distance of at least N/2 pixels from the ends thereof, an analysis window (FA) centered in width on this pixel (PIX) is defined.

The N/2 columns of pixels to the right and the N/2 columns of pixels to the left of the pixel are therefore taken into account. The height of each analysis window is defined in number of pixels $M_1$. Selection of $M_1$ depends on the distribution of the reflectors. The analysis window preferably covers 1 to 3 other reflectors in order to characterize the local layout of the reflectors in relation to one another. Thus, for each pixel placed on reflector R, located at a distance of at least N/2 pixels from the ends thereof, an analysis window (FA) centered in width on this pixel, whose size is N columns by $M_1$ pixels in height, thus in accordance with the shape of the reflector, as illustrated by FIG. 3C, is defined.

This window of size $M_1 \times N$ can be centered in height on the reflector or vertically offset in relation to it. The amplitude of the offset is controlled by an offset parameter $P_{dec}$ that corresponds to a number of pixels. For example, the offset can be adjusted in such a way that the window is placed completely above or below the reflector, in order to characterize the image zone placed above or below the reflector. These two extreme solutions are particularly advantageous embodiments of the method insofar as they allow characterization of subsoil zones contained below or above reflectors, and it provides homogeneity of the data analyzed. For example, FIG. 3C illustrates the analysis window (FA) of the pixel (PIX) placed at the centre of reflector R made up of 6 pixels (N=5). This window is entirely offset vertically below the reflector ($P_{dec}=3$).

Horizontalization (Stage 6)-HOR

Figure 3D:
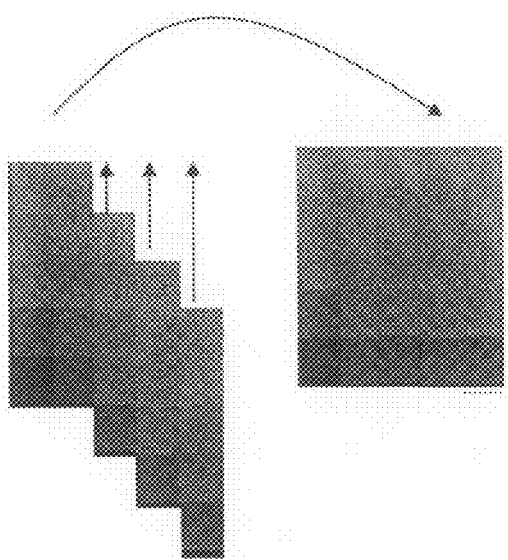
Figure 5:
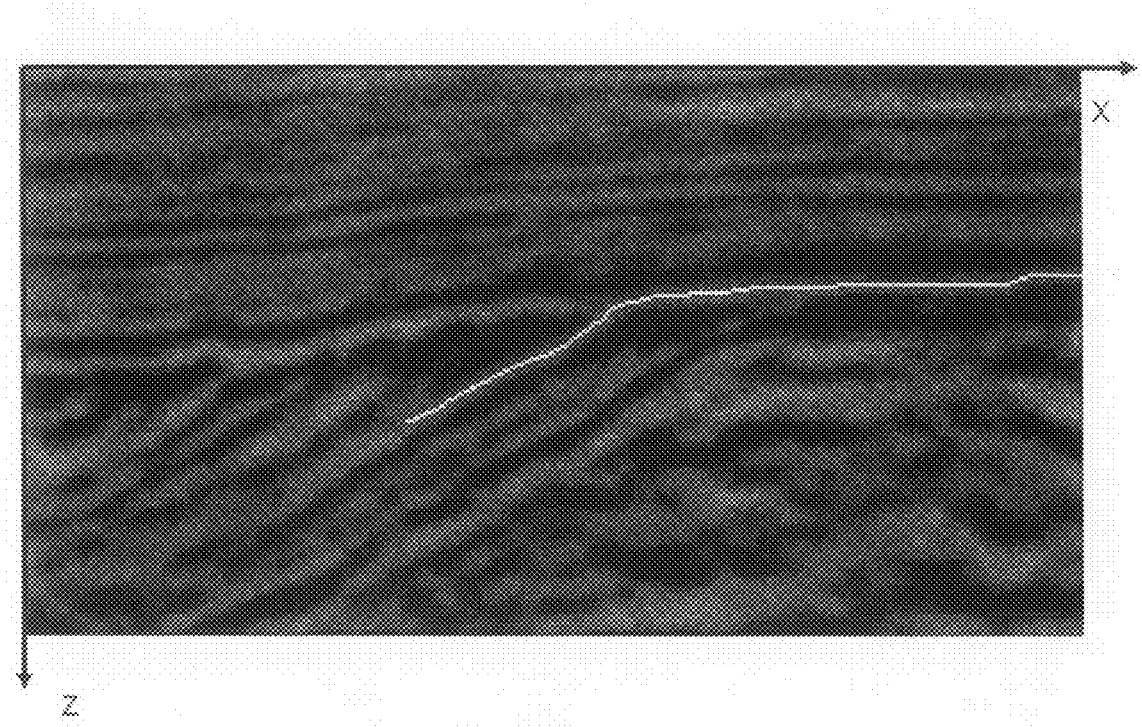
FIG. 5 shows selection of a reflector.
Figure 6:
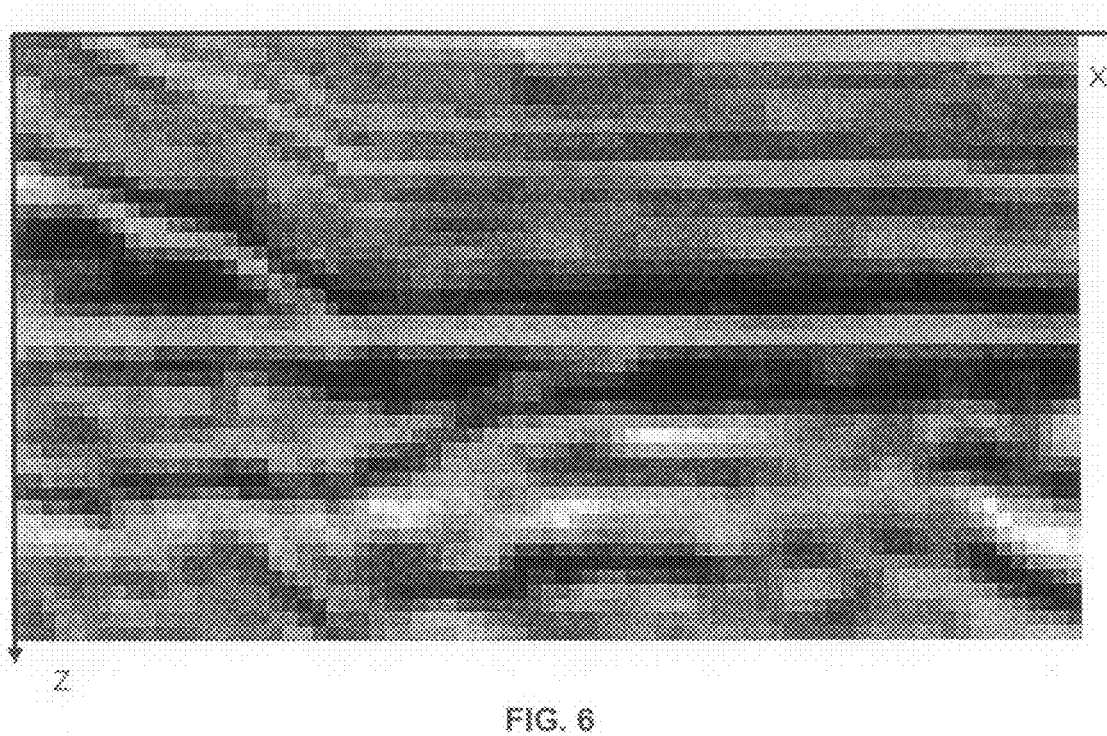
FIG. 6 shows a straightened neighborhood around a reflector.

The window is then deformed by vertical sliding of the columns thereof, so as to obtain a rectangular window, according to the diagram of FIG. 3D, which amounts to straightening the reflector of interest R in such a way that it is horizontal. The results of this stage applied to the example of FIG. 5 is shown in FIG. 6. The windows extracted above and below the reflector are denoted by $FA_u$ and $FA_o$.

This deformation of the analysis windows allows bringing the windows back to a rectangular shape, suited to processing by image analysis algorithms.

Calculation of Attributes Characterizing the Analysis Windows R (Stage 7)-ATTRIB From the analysis windows, data that are homogeneous regarding the reflectors are extracted. This means that, thanks to the method according to the invention, it is possible to automatically select data along a reflector, on either side, just above or just below each reflector of interest (having a size compatible with the size of the sliding window).

From these data specific to each reflector, an attribute capable of synthesizing the information contained in these data, so as to draw conclusions on the sedimentary deposit of the underground zone studied, is determined. This stage determines attributes characterizing the analysis window, horizontalized or not.

Various attributes that are particularly pertinent for stratigraphic interpretation can be mentioned by way of example:

the mean grey level of the image of the data selected by an analysis window FA, as those shown in FIG. 6, $FAH_u$ or $FAH_o[,]$;

the standard deviation of the levels of grey of the image of the data selected[,];

texture attributes of the image of the horizontalized analysis window, notably its dominant orientation.

The latter example is described in detail hereafter. The dominant local orientation can be determined by various methods. The method described below has the advantage of being suited to the nature of the seismic data.

This analysis is performed locally on the windows extracted and straightened in stage 6, of size $M_1 \times N$. Straightened reflector R is thus followed pixel after pixel by extracting each time a new window until it has been entirely browsed. An oversampled complex frequency transformation (for example a redundant Fourier type transform) is then performed on each window, which leads to a new image F. The image formed by the module of the transformed image is then considered, which is conventionally denoted by |F|, wherein the maxima are sought. Since input data are real, the complex transformation leads to an image |F| that is symmetrical in relation to its center. Seeking the maxima thus leads to two symmetrical peaks in relation to the center of |F|, thus defining a direction. The direction orthogonal to this direction is referred to as dominant direction.

This dominant direction search method can be applied to the zone located above the reflector (strictly or not), the zone located below the reflector (strictly or not) or zones containing the reflector depending on the type of neighborhood extracted during the previous stage.

It is also possible to calculate other attributes allowing evaluation of the apparent disorder (mixture of directions) in an image. For example, the value, in module, can be returned from one of the peaks of the dominant symmetrical pair, then the values of the second pair of symmetrical peaks are sought by applying a directional mask to the principal direction of the peaks in |F|. By repeating this procedure, several peak values of different weights, that will be used later, can thus be returned.

All the attributes mentioned here can be calculated in 3D. The only difference is that, in this case, the dominant direction is no longer represented by a single angle as in the 2D case, but by a pair of angles defining a vector normal to the dominant surface.

These attributes, calculated for each analysis window associated with each pixel of each reflector, are associated with the pixels making up the reflectors.

Loop on the Elements of S (Stage 8)-RNT

This part of the method checks if all the reflectors of S have been browsed. If this is the case ($Rep_1$), the interpretation stage is started, otherwise ($Rep_2$) stage 4 is again performed.

Thus, at the end of this stage B) of attribute calculation by means of suitable analysis windows, whose shape is controlled by the automatically digitized reflectors, each pixel making up the reflectors is informed by pertinent quantities in the sense of the interpretation in seismic stratigraphy, such as for example the relative direction (convergence) in relation to the neighboring reflectors.

C) Interpretation of the Attributes: Reflectors Sorting (Stage 9)-INTRP

This attribute interpretation stage first determines, then assigns mean attributes to the reflectors, and then sorts the reflectors according to the values of the mean attributes. The sorting of the reflectors is achieved on the basis of various geometrical characteristics such as, for example, the convergence measurements calculated in the previous stage, so as to keep only the pertinent ones in the sense of stratigraphic interpretation.

According to the above stages, a set of scalar or vector values is assigned to each pixel of each reflector which are referred to as "pixel attributes". The attribute interpretation stage reduces and sorts the reflectors. The following stages are therefore used:

reducing the number of attributes by combining them. An example calculates continuities or apparent disorders from peak value data that have been previously returned. In fact, comparing the "weight" of the principal direction and of the secondary direction allows to deducing the degree of local disorder (mixture of directions) along the reflectors selected. Another example no longer considers the angle above and below a reflector, but the difference between them;

sorting the pixels of all the reflectors and keeping only those whose attributes meet selected criteria. An example of criterion defines an allowable range for each pixel attribute: for example, only the pixels for which the dominant direction in the image located above or below exceeds a given threshold are retained, which is translated into a local angular divergence of the reflector in relation to the neighboring reflectors. A last example of criterion is the belonging to attribute classes defined by means of statistical classification algorithms or neural networks;

redefining the reflectors on the basis of the contiguous pixels selected in the previous stage;

calculating "reflector attributes", for example by averaging the attributes of the pixels thereof, or by analyzing the shape of the reflector: the number of pixels that make up the reflector is an example of a reflector attribute characterizing the length thereof. The mean value of the level of grey is another attribute example that characterizes the "brightness" of the reflector. The mean value of the dominant orientation of the image above (respectively below) the reflector is an attribute that characterizes the mean angular divergence of the reflector in relation to the neighboring reflectors;

sorting the reflectors so as to keep only those whose attributes meet selected criteria. A criterion example is an allowable range for each reflector attribute. As for sorting the pixels that make up the reflectors, statistical sorting methods or neural network methods can also be used at this stage.

Figure 7:
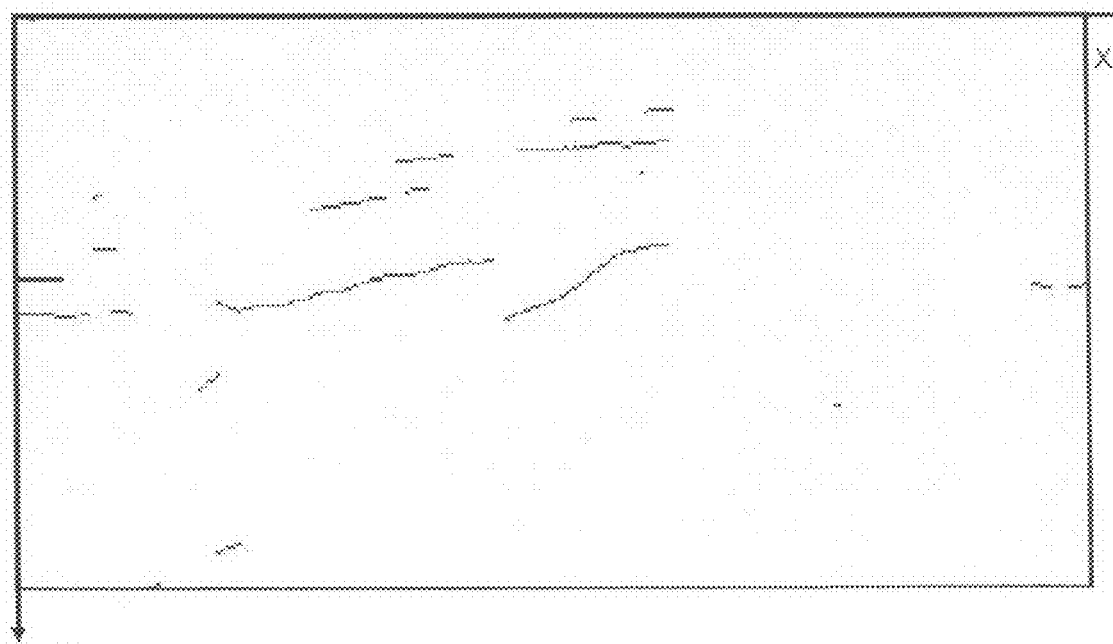
FIG. 7 shows the result of sorting for a complete image.

FIG. 7 shows the result of this automatic interpretation using the attributes of angles above and below each reflector, calculating their difference and keeping only the angles above 0.2 radian. The reflectors corresponding to the convergence zone appear in this image.

From a stratigraphic interpretation of these reflectors carefully selected from stratigraphic criteria, it is possible to reconstruct the sedimentary history of the underground zone from which the seismic data are extracted.

Thus, the method according to the invention combines three approaches: shape recognition for seeking all the reflectors that the image to be analyzed comprises, image analysis for characterizing the texture of the image in the neighborhood of the reflectors detected in analysis windows, and finally classification and automatic sorting of reflectors on the basis of attributes.

The invention thus provides, from any seismic image, a set of reflectors automatically selected from stratigraphic criteria.

This method thus constitutes a tool allowing the seismic stratigraphy interpreter to find clues for reconstructing the sedimentary history of the zone studied, and thus to find zones of the subsoil likely to constitute oil traps.

The invention claimed is:

1. A method for stratigraphic interpretation of seismic data for determining a sedimentary history of an underground zone, wherein the data are obtained from measurements in the zone and form a multidimensional image including pixels and seismic reflectors, comprising:

digitizing the seismic reflectors with a shape recognition technique applied to the image;

calculating, for at least one reflector, at least one attribute characteristic of a structure of the image in a vicinity of the reflector, with an image analysis technique applied to at least one analysis window whose shape depends on the at least one reflector;

selecting the at least one reflector using stratigraphic interpretation of the attribute; and reconstructing the sedimentary history of the underground zone from a stratigraphic interpretation of the selected at least one reflector.

2. A stratigraphic interpretation method as claimed in claim 1, wherein the shape recognition technique comprises:

applying a reflector vectorization method wherein the image is analyzed by a sliding window successively centered on each pixel of the image, and if the pixel placed at the center of the analysis window takes a highest or a lowest value of the at least one analysis window, the lowest value takes a value x, otherwise the at least one analysis window takes a value that is different from x;

digitizing the reflectors by seeking contiguous pixels of equal value and by carrying out a connectivity search; and carrying out a reflector preselection to keep only the reflectors meeting predetermined stratigraphic criteria.

3. A stratigraphic interpretation method as claimed in claim 2, wherein the reflector preselection is performed by keeping only the reflectors having a given minimum length.

4. A stratigraphic interpretation method as claimed in claim 3, wherein the shape recognition technique comprises directional filtering.

5. A stratigraphic interpretation method as claimed in claim 3, wherein the analysis window comprises N columns of fixed height and the columns are centered in height on the at least one reflector to conform to a shape of the at least one reflector.

6. A stratigraphic interpretation method as claimed in claim 5, wherein the analysis window is translated vertically in relation to the at least one reflector according to one of the following extreme configurations: totally below the at least one reflector.

7. A stratigraphic interpretation method as claimed in claim 6, wherein the analysis window is defined for each pixel of at least one reflector located at a distance of at least N/2 pixels from the ends of the at least one reflector.

8. A stratigraphic interpretation method as claimed in claim 7, wherein the analysis window is deformed by vertical sliding of columns thereof to obtain a window of rectangular shape.

9. A stratigraphic interpretation method as claimed in claim 6, wherein the analysis window is deformed by vertical sliding of columns thereof to obtain a window of rectangular shape.

10. A stratigraphic interpretation method as claimed in claim 5, wherein the analysis window is defined for each pixel of at least one reflector located at a distance of at least N/2 pixels from the ends of the at least one reflector.

11. A stratigraphic interpretation method as claimed in claim 10, wherein the analysis window is deformed by vertical sliding of columns thereof to obtain a window of rectangular shape.

12. A stratigraphic interpretation method as claimed in claim 5, wherein the analysis window is deformed by vertical sliding of columns thereof to obtain a window of rectangular shape.

13. A stratigraphic interpretation method as claimed in claim 2, wherein the shape recognition technique comprises directional filtering.

14. A stratigraphic interpretation method as claimed in claim 13, wherein the analysis window comprises N columns of fixed height and the columns are centered in height on the at least one reflector to conform to a shape of the at least one reflector.

15. A stratigraphic interpretation method as claimed in claim 14, wherein the analysis window is translated vertically in relation to the at least one reflector according to one of the following extreme configurations: totally below the at least one reflector.

16. A stratigraphic interpretation method as claimed in claim 15, wherein the analysis window is defined for each pixel of at least one reflector located at a distance of at least N/2 pixels from the ends of the at least one reflector.

17. A stratigraphic interpretation method as claimed in claim 16, wherein the analysis window is deformed by vertical sliding of columns thereof to obtain a window of rectangular shape.

18. A stratigraphic interpretation method as claimed in claim 15, wherein the analysis window is deformed by vertical sliding of columns thereof to obtain a window of rectangular shape.

19. A stratigraphic interpretation method as claimed in claim 14, wherein the analysis window is defined for each pixel of at least one reflector located at a distance of at least N/2 pixels from the ends of the at least one reflector.

20. A stratigraphic interpretation method as claimed in claim 19, wherein the analysis window is deformed by vertical sliding of columns thereof to obtain a window of rectangular shape.

21. A stratigraphic interpretation method as claimed in claim 14, wherein the analysis window is deformed by vertical sliding of columns thereof to obtain a window of rectangular shape.

22. A stratigraphic interpretation method as claimed in claim 2, wherein the analysis window comprises N columns of fixed height and the columns are centered in height on the at least one reflector to conform to a shape of the at least one reflector.

23. A stratigraphic interpretation method as claimed in claim 22, wherein the analysis window is translated vertically in relation to the at least one reflector according to one of the following extreme configurations: totally below the at least one reflector.

24. A stratigraphic interpretation method as claimed in claim 23, wherein the analysis window is defined for each pixel of at least one reflector located at a distance of at least N/2 pixels from the ends of the at least one reflector.

25. A stratigraphic interpretation method as claimed in claim 24, wherein the analysis window is deformed by vertical sliding of columns thereof to obtain a window of rectangular shape.

26. A stratigraphic interpretation method as claimed in claim 23, wherein the analysis window is deformed by vertical sliding of columns thereof to obtain a window of rectangular shape.

27. A stratigraphic interpretation method as claimed in claim 22, wherein the analysis window is defined for each pixel of at least one reflector located at a distance of at least N/2 pixels from the ends of the at least one reflector.

28. A stratigraphic interpretation method as claimed in claim 27, wherein the analysis window is deformed by vertical sliding of columns thereof to obtain a window of rectangular shape.

29. A stratigraphic interpretation method as claimed in claim 22, wherein the analysis window is deformed by vertical sliding of columns thereof to obtain a window of rectangular shape.

30. A stratigraphic interpretation method as claimed in claim 1, wherein the calculation of the attribute comprises:
   calculating at least one pixel attribute for each analysis window;
   sorting pixels of all reflectors to keep only those reflectors having pixel attributes meeting a criteria selected by an interpreter;
   redefining all reflectors using contiguous pixels selected in sorting the pixels of all reflectors;
   calculating attributes characterizing a reflector from pixel attributes calculated for each selected pixel; and
   sorting the reflectors to keep only those reflectors with attributes meeting criteria selected by the interpreter.

31. A stratigraphic interpretation method as claimed in claim 30, wherein the criterion defines an allowable range for each pixel attribute.

32. A stratigraphic interpretation method as claimed in claim 30, wherein the criterion is belonging to attribute classes defined by statistical classification algorithms or neural networks.

33. A stratigraphic interpretation method as claimed in claim 30, wherein the pixel attributes calculated for each window are selected from among at least one of the following attributes:
   a mean grey level of the analysis window;
   a standard deviation of grey levels of the analysis window;
   a texture attribute of the analysis window;
   the dominant direction within the analysis window; and
   an apparent disorder within the analysis window.

34. A stratigraphic interpretation method as claimed in claim 33, wherein determination of the dominant orientation within the analysis window comprises:
   constructing a first image F by performing for any analysis window an oversampled complex frequency transformation;
   constructing a second image |F|, by calculating the module of the first image F; and
   seeking maxima within the second image |F| to determine two symmetrical peaks in relation to a center of second image |F| to define a direction, whose orthogonal direction corresponds to the dominant direction.

* * * * *